(12) United States Patent
Griffiths et al.

(10) Patent No.: US 7,093,196 B1
(45) Date of Patent: Aug. 15, 2006

(54) METHOD AND APPARATUS FOR ALIGNING ITEMS RELATIVELY WITHIN AN ELECTRONIC DOCUMENT

(75) Inventors: David T. Griffiths, Reading (GB); Michael L. Gardner, Wokingham (GB); James Semple, Woodley Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 789 days.

(21) Appl. No.: 09/592,211

(22) Filed: Jun. 10, 2000

(51) Int. Cl.
 *G06F 17/24* (2006.01)
 *G06F 17/00* (2006.01)
 *G06F 15/00* (2006.01)
 *G06F 17/21* (2006.01)

(52) U.S. Cl. ............... 715/518; 715/760; 715/762; 715/777; 715/788

(58) Field of Classification Search ........ 715/517–521, 715/760, 761–766, 777, 788
See application file for complete search history.

(56) References Cited

U.S. PATENT DOCUMENTS 4,974,174 A * 11/1990 Kleinman ............... 345/678
5,379,375 A * 1/1995 Dao et al. ............... 715/862
5,577,189 A * 11/1996 Gay et al. ............... 715/800
5,796,401 A * 8/1998 Winer ..................... 345/619
6,072,484 A * 6/2000 Kuroda .................. 715/799
6,144,974 A * 11/2000 Gartland ................. 715/517
6,686,935 B1 * 2/2004 Richard ................... 715/765

OTHER PUBLICATIONS

Microsoft Visual Basic 5.0 Programmer's Guide, 1997, pp. 5-9, 39-74, 541-612, Redmond, Washington 98052-6399.*
Microsoft Word 2000, © 1983-1999 Microsoft Corporation, pp. 1-8.*

* cited by examiner

*Primary Examiner*—Heather R. Herndon
*Assistant Examiner*—Paul H. Nguyen-Ba
(74) *Attorney, Agent, or Firm*—Bingham McCutchen LLP (57) ABSTRACT

A method and apparatus allowing items to be relatively positioned within an electronic document is disclosed. By positioning the items relative to each other, as opposed to absolutely with respect to the page, this allows for a greater versatility in the page layout. Utilization of this method and apparatus means that items can be automatically aligned on a page. Furthermore if additional items are inserted, the position of the original items can be automatically adjusted to ensure that correct alignment is maintained.

23 Claims, 10 Drawing Sheets

| Ap | MH | Mor | Tab | Cd | Name | Item tab start | Item tab end | Align prompt start |
|---|---|---|---|---|---|---|---|---|
| TR | MH | TITL | TI | PF | PRODUCT_CODE | 100 | | |
| TR | MH | TITL | TI | T | PREVIEW | 400 | | |
| TR | MH | TITL | TI | TL | TITLE | 100 | 300 | |
| TR | MH | TITL | TI | DE | TI_TYPE | 100 | | |
| TR | MH | TITL | TI | PL | DEFAULT_DAYS | | 200 | Yes |
| TR | MH | TITL | TI | PF | PL_PRICE_CODE | 100 | | |
| TR | MH | TITL | TI | ME | PRICE | | 200 | Yes |
| TR | MH | TITL | TI | GA | MEDIUM | | 300 | |
| TR | MH | TITL | TI | MI | GAME_CATEGORY | 100 | | |
| TR | MH | TITL | TI | MC | MINIMUM_MEMORY | | 200 | Yes |
| TR | MH | TITL | TI | AG | MOVIE_CATEGORY | 100 | | |
| TR | MH | TITL | TI | DL | AGE_RATING | | 200 | Yes |
| TR | MH | TITL | TI | AL | DURATION | 100 | | |
| TR | MH | TITL | TI | MC | AUDIO | | 200 | Yes |
| TR | MH | TITL | TI | DE | MONOCHROME | | 300 | |
| TI | MH | TITL | TI | PF | DESCRIPTION | 100 | 300 | |

METHOD AND APPARATUS FOR ALIGNING ITEMS RELATIVELY WITHIN AN ELECTRONIC DOCUMENT

FIELD OF THE INVENTION

The present invention relates to a method and apparatus for aligning items within an electronic document.

BACKGROUND TO THE INVENTION

The positioning of items, such as text, text and dialogue boxes, images, and the like, within an electronic document is currently achieved in one of a number of ways. This includes using the tab settings, specifying a position for the item, or simply arranging for the item to be displayed in a particular location.

The most popular method of locating items within documents is to use tab settings. The tab settings specify a modifiable position at which various items can be located. The tab settings specify the position as a distance from the left hand margin and are therefore absolute in character. Accordingly, if items are to be aligned in a vertical fashion, each item must have the same horizontal tab setting.

Alternatively, the actual position of an item within a page can also be specified by using horizontal and vertical advance settings. These similarly operate to position the item at a absolute specified position in the page.

Similarly, the item can be arranged to be displayed in a certain position, for example by using a suitable number of carriage returns and spaces to allow the item to be positioned as desired. However, all of the above systems suffer from the disadvantage that they position the items absolutely relative to the margins, and/or page edges. As a result, if it is desired to have a particular page arrangement, it is necessary to specify the position of each item absolutely. This results in a large number of complications should it be necessary to insert additional items at intermediate locations, or the like. Similarly, problems arise when documents are imported between software packages that utilize different tab setting scales. This can lead to the undesirable reformatting of documents when displayed on a different computer.

SUMMARY OF THE INVENTION

In accordance with the first aspect of the present invention, we provide a method of aligning items within an electronic document, each item having a relative tab indication, the method according to an embodiment comprising the steps of:
  a. determining the relative tab indication of the first item;
  b. positioning the first item within the document; and,
  c. for each further item:
  i. determining the relative tab indication of the item;
  ii. positioning the item within the document in accordance with the relative tab indication and the position of each previously positioned item.

In accordance with a second aspect of the present invention, we provide apparatus for aligning items within a document, the apparatus according to an embodiment including a display for displaying the document; and, a processor, the processor being adapted to:
  a. determine the relative tab indication of the first item;
  b. position the first item within the document; and,
  C. for each further item:
  i. determine the relative tab indication of the item;
  ii. position the item within the document in accordance with the relative tab indication and the position of each previously positioned item.

Accordingly, the present invention provides a method and apparatus which when suitably used allows items to be relatively positioned within a document. By positioning the items relative to each other, as opposed to absolutely with respect to the page, this allows for a greater versatility in the page layout. In particular, utilization of this method and apparatus means that items can be automatically aligned on a page. Furthermore if additional items are inserted, the position of the original items is automatically adjusted to ensure that correct alignment is maintained.

Usually any items with a relative tab indication greater than the tab indication of a previously positioned item are displaced from the previous item in a first direction. Typically, when this involves placing an item within a document on a computer screen or the like, the item having the higher tab value is positioned to the right of the item having the lower tab value.

If an item with no tab indication is to be positioned, this is normally displaced from a previous item in the first direction. Accordingly, it can be positioned on the same line as, but located to the right, of the previous items.

For any items having a relative tab indication less than the relative tab indication of a previously positioned item, the item is usually displaced from the previous item in a second direction opposite to the first direction. Thus, if an item having a lower tab indication is to be positioned, it is normally placed to the left of the higher relative tab indication item.

In this case, the item having a relative tab indication less than the relevant tab indication of the previously positioned item is also usually displaced from a previously positioned item in a third direction perpendicular to the first direction. Thus, the item having the lower tab indication is usually positioned below and to the left of the item having a higher tab indication value.

Typically any items having a relative tab indication equal to or greater than the relative tab indication of previously positioned items are aligned with the previously positioned items in the first direction. Thus, items having identical tab indication values are vertically aligned within documents.

Typically each relative tab indication includes at least one of first and second tab values. Each relative tab value representing the relative tab position of a specific portion of the item. This allows the start and end of items to be located within a document allowing documents to be designed as required.

Typically each item has a predetermined size. In this case, the method usually comprises positioning each item so as to ensure a predetermined distance exists between items in the first direction. It will be realised, that the predetermined size may either be set by the user, or if no value is set, be a default value.

Accordingly, the items are positioned in a first direction in accordance with the relative tab indication with the method further comprising adjusting the relative positioning to maintain at least a predetermined separation between the items.

The apparatus for aligning items within a document also includes a store for storing the relative tab indications of items to be positioned, the processor being adapted to cooperate with the store to allow the processor to determine the relative tab indications therefrom.

Typically, the apparatus also includes an input device for allowing the user to input relative tab indication values. This will typically consist of a computer or the like. Alternatively however, the tab indications can be downloaded directly from an external source.

The present invention also relates to a document having a number of items therein the document being created using apparatus according to the second aspect of the invention or having the items aligned in accordance with a method according to the first aspect of the present invention.

BRIEF DESCRIPTION OF THE DRAWINGS

FIG. 16 is a diagram of a system architecture with which the present invention can be implemented.

FIG. 17 is an additional diagram of system architecture with which the present invention can be implemented.

DETAILED DESCRIPTION OF THE DRAWINGS

Figure 1:
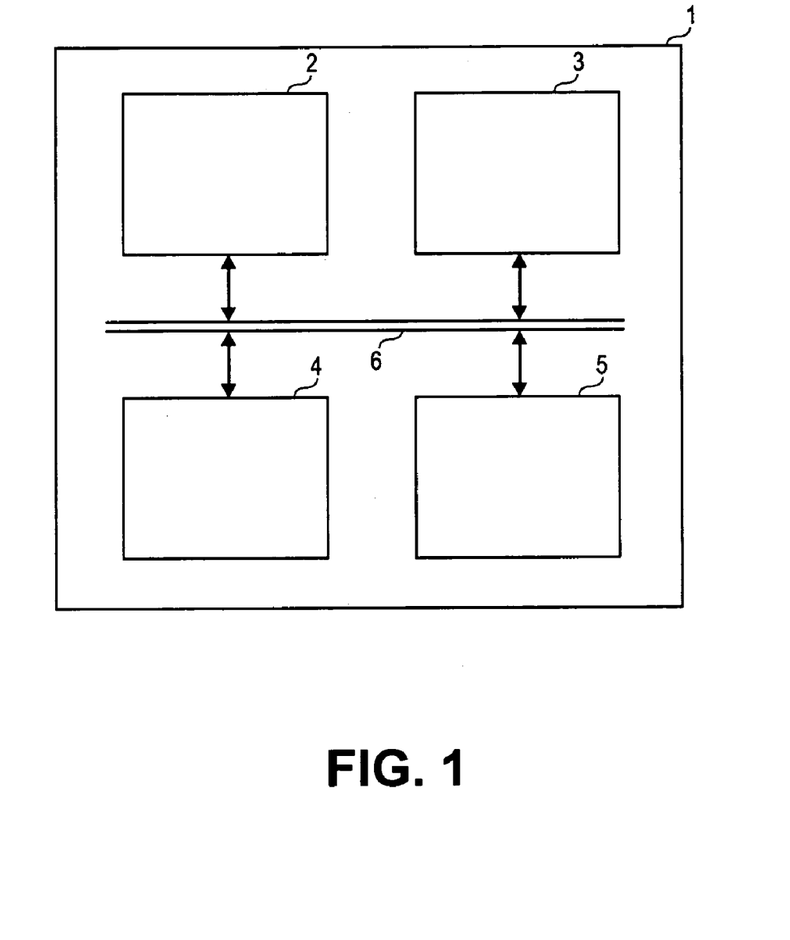
FIG. 1 is a schematic diagram of a processing system for implementing the present invention.

FIG. 1 shows a processing system 1 suitable for implementing the present invention. The processing system includes a processor 2, a memory 3, a display 4 and an input device 5 all of which are interconnected via a bus 6.

As will be appreciated by a person skilled in the art, the processing system may therefore be any processing system which can implement a software program on the processor 3. Thus, for example, the processing system 1 could comprise a personal computer, a unit work station, a laptop, a palm top, a wireless communication s system or the like. Additionally, it will be appreciated that the processing system may be interconnected to other processing systems via a communications network (not shown).

In use, the processor 2 is adapted to implement a program, such as a design generator which can be used for designing forms or the like. Examples of design forms are shown in FIGS. 2A, 2B and 2C.

Figure 2A:
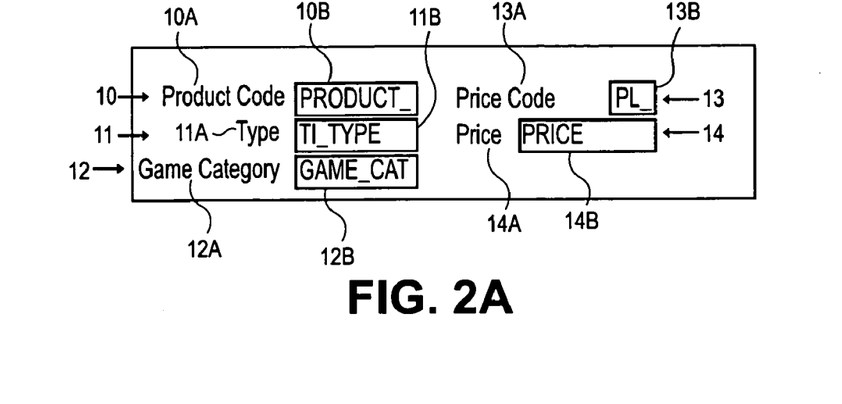
FIG. 2A is a first example of items aligned within a document in accordance with the present invention.

As shown in FIG. 2A, the document includes a number of items 10,11,12,13,14 each of which includes a prompt 10A,11A,12A,13A,14A and a box 10B,11B,12B,13B,14B. The document, once designed is typically used for data entry purposes. Accordingly, it is desirable to have the boxes aligned such that the document has a readily understandable appearance. In this example, the boxes 10B,11B,12B have both the start and ends of the boxes aligned. In contrast to this, the boxes 13B,14B only have the ends of the boxes aligned as shown. In addition to this, the prompts 13A,14A of the items 13,14 are vertically aligned.

Figure 2B:
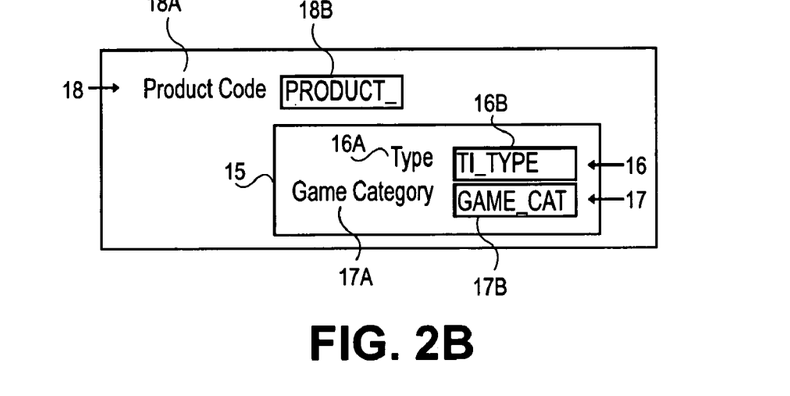
FIG. 2B is a second example of items aligned in a document in accordance wi the present invention.

Additionally, as shown in FIG. 2B, it is possible for items to be combined into a group shown at 15. In this example, a box 18B is aligned with the start of the group 15, as shown. In this case, the start of boxes 16B,17B are aligned.

Figure 2C:
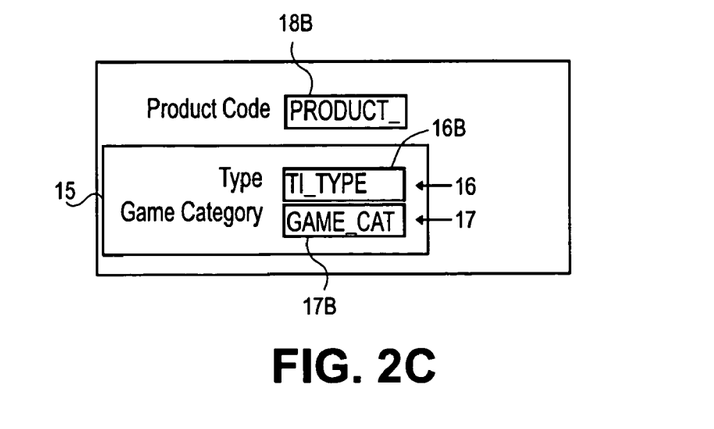
FIG. 2C is a third example of items aligned within a document according to the present invention.

A further example is shown in FIG. 2C. In this example, the start of the box 18B is aligned with the start of the boxes 16,17, as shown.

Figure 3:
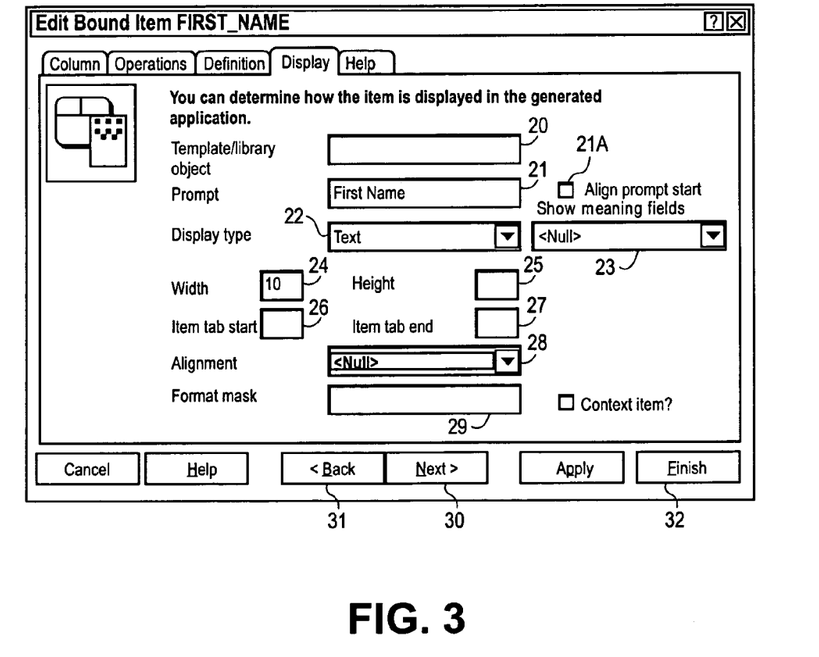
FIG. 3 is an example of the input screen used for constructing a document in accordance with the present invention.

Operation of the system to allow relative tabs to be defined will now be described. Firstly, the software program implemented by the processor 2 causes an item entry screen to be presented to the user on the display 4. An example of a suitable screen is shown in FIG. 3. The screen includes a template/library object field 20 a prompt field 21, an align prompt tick box 21A, a display type field 22, a show meaning field 23, a width field 24, a height field 25, an item to start tab field 26, and a item tab end field 27. Also provided are an alignment field 28 and a format mask field 29.

In use, when the operator is generating a form or document with aligned items, the user will enter details of each item by entering appropriate details in the relevant fields 20–29. Thus, the templates/library object field 20 is used if a particular template is to be used for the item.

The prompt field 21 is used to specify the prompt which is associated with the respective item. If the align prompt start tick box is checked, this will cause prompts to be aligned, as will be described in more detail below. The display type and show meaning fields 22,23 are used to specify the type of data that can be entered into each item. The width and height fields 24,25 are used to set the width and height of each item box. If no values are entered in these fields, then predefined default values will be used.

The item tab start field 26 and the item tab field 27 are then used for entries of relative tab values. The tab values are used for aligning the item with other items on the page. In general, items having equal tab values will be vertically aligned and items having larger tab values will be displaced to the right in the document, as will be explained in more detail below. Alignment and format mask details can also entered in the appropriate fields 28,29.

Once the details of a particular item have been entered, a next button 30 can be used to allow subsequent items to be entered. In this case, once the next button is pressed, the data entered in the fields 20–29 will be downloaded into an item list, as will be explained. The fields will then be cleared to allow new items to be defined. Previous items can be edited by clicking on the back button 31. Once all items have been entered, the finish button 32 is pressed.

Once an item has been defined using this system, the processor 2 operates to place the defined item in an item list. An example of an item list is shown in FIG. 4.

Figure 4:
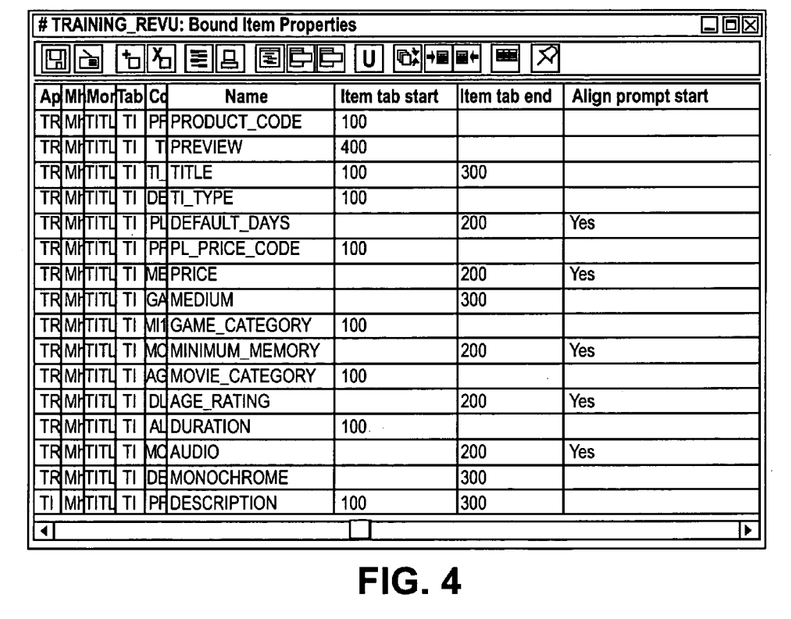
FIG. 4 is an example of a list screen showing the defined items for a document.

FIG. 4 shows a list screen which sets out in order the details of each item. For clarity purposes, only the name, item tab start value, item tab end value and the line prompt start details are shown in this representation. The item list shown in FIG. 4 is editable, allowing users to add, remove or alter items within the list.

Thus, the first item in the list is a "Product Code" item, which has an item tab start value of 100. The next item is a "Preview" item having an item tab start of 100 and the third item is a "Title" item having a item tab start value 100.

In use, the processor 2 operates to place items in the document in the order they are entered on the item list. Thus, the processor 2 will access the first item on the list to determine that it has an item tab start value of 100 and position the item within the document, as will be explained in more detail below.

The processor 2 then identifies each next item on the list in turn and positions it in accordance with the position of the previously positioned items, and the defined relative tab values. Once this has been completed, the processor adjusts the relative positioning of the relative tab values to minimise the space utilised in the document.

Figure 5:
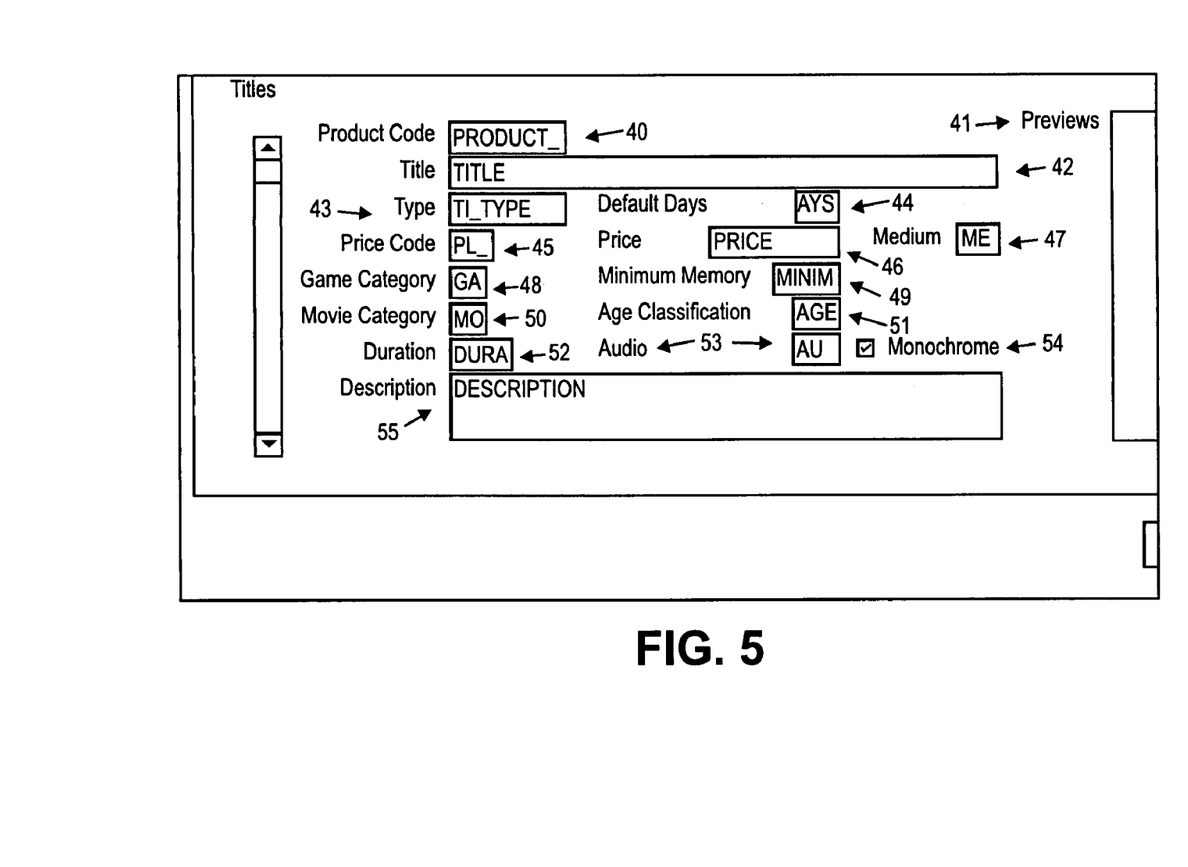
FIG. 5 is an example of the constructed document defined by the list shown in FIG. 3.

For the item list shown in FIG. 4, this results in the generation of the document shown in FIG. 5. In this example, the list is converted into a Product Code item 40, a Preview item 41, a Title item 42, a Type item 43, a Default Days item 44, a Price Code item 45, a Price item 46, a Medium item 47, a Game Category item 48, a Minimum Memory item 49, a Movie Category item 50, an Age Classification item 51, a Duration item 52, an Audio item 53, a Monochrome check box 54 and a Description item 55.

In order to be able to align items in this manner, the processor 2 initially positions the items on respective vertical tab lines, shown as the dotted lines 100, 200, 300, 400 in FIG. 5, in accordance with the relative tab values.

The tab lines 100, 200, 300, 400 are notional vertical lines within the document which are generated by the processor 2 to aid with the alignment of items. Each tab line is assigned a tab value corresponding to one of the tab values of the items to be arranged. Any subsequent items having the same tab value can simply be positioned on the same tab line, thereby ensuring that the items are vertically aligned as required.

Once all the items have been positioned on respective tab lines, in accordance with the relative tab values, the processor operates to minimise the spacing between the tab lines, thereby minimising the space utilised in the document.

The processor 2 initially positions the items using the following procedures.

1. The first item to be encountered is positioned on an appropriately valued tab line at the top left hand corner of the document, as shown by the Product Code item 40. This may be subsequently moved depending on the positioning of other items (see for example step 4 below).

2. Any items having a higher tab value are aligned with a new higher value tab line, vertically to the right of the previous lower value tab line.

a. If possible, the item is placed on the same horizontal line, as shown for example by the Preview item 41 which is positioned to the right of the Product Code item 40.

b. Alternatively, the item is placed on a lower horizontal line, as shown for example by the Default Days item 44 which is positioned to the right of the Type item 43.

3. Any items having an identical tab value are positioned on the corresponding valued tab line, aligned with the relevant start or end of the previously positioned item. This is achieved by placing the item on a lower horizontal line. As shown for example by the start of the box of the Title item 42, which is positioned below the start of the box of the Product Code item 40.

4. Any items having a lower tab value are positioned on a tab line to the left of a higher value tab line, on a lower horizontal line. As shown for example by the Price Code item 45 which is positioned to the left of the Default Days item 44. This may require the repositioning of previous items.

5. The prompts of any items having the align prompt start box ticked will be vertically aligned with the prompt of other items having the same tab values.

6. Any items not having a tab value will be positioned on the same line as the previous item, displaced to the right in the document.

6. Any items not having a tab value will be positioned on the same line as the previous item, displaced to the right in the document.

Once this has been completed, the processor operates to minimize the spacing used in the document. This is achieved by having the processor move the higher value tab lines towards the lower value tab lines. This process is continued as far as possible, whilst ensuring that:

a. all items remain aligned with the appropriately valued tab line; and b. items on the same horizontal line are positioned as close together as possible, whilst maintaining at least a predetermined gap between the items.

Thus, each line in turn (from the lowest tab value to the highest) is progressively moved towards the lower tab value line until only a predetermined gap exists between an item on the line and an item on a lower tab value line.

Figure 6A:
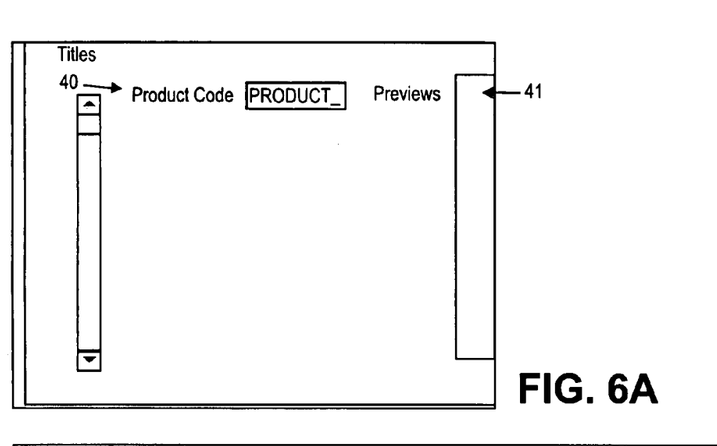
FIGS. 6A to 6C show three stages of the construction of a document using the item list shown in FIG. 4; and, FIGS. 7 to 15 are examples of documents generated in accordance with the examples set out in Appendix A.
Figure 6B:
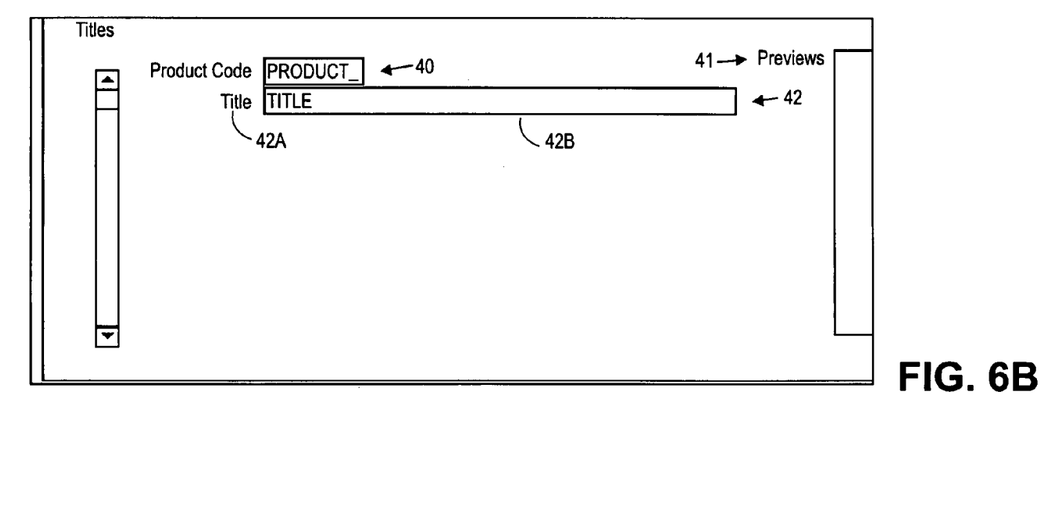
Figure 6C:
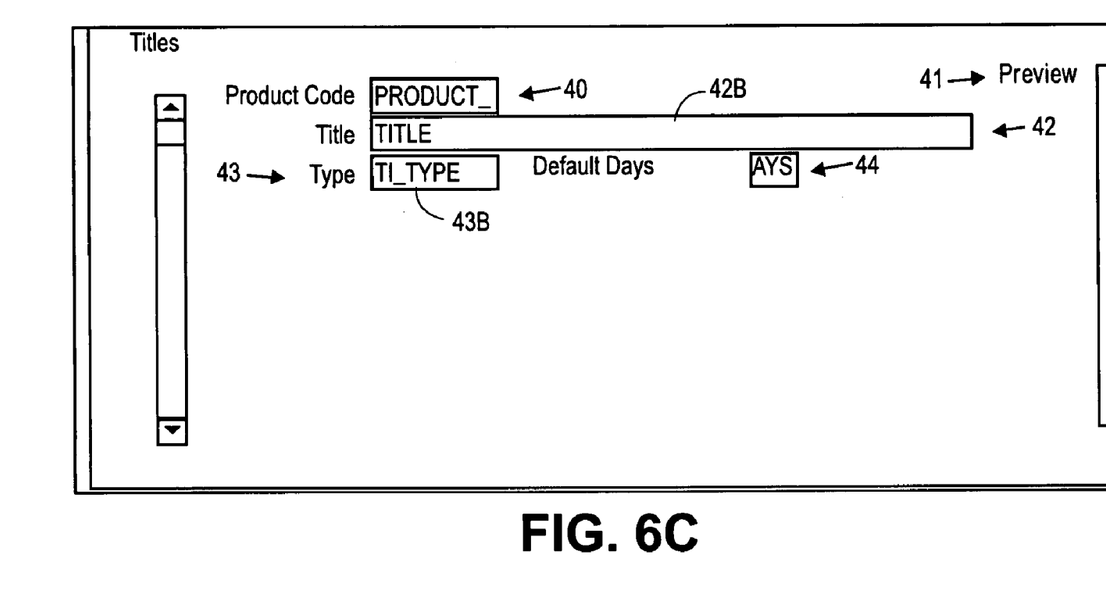

The first stages of the construction of the document are shown in FIGS. 6A to 6C. Thus, the processor 2 initially positions the Product Code item 40 on a new tab line 100 in the top left hand corner of the document. The Preview item 41 is then positioned on a tab line 400 to the right of the tab line 100 and hence to the right of the Product Code item 40, as shown in FIG. 6A.

Next, the Title item 42 is added as shown in FIG. 6B. In this case, the Title item has an item tab start of 100 and accordingly the start of the item is placed on the tab line 100. The item also has an item tab end 300 which is aligned with a new tab line 300. Accordingly, the tab line 400 and hence the preview item must be displaced to the right hand side of the document to accommodate the Title item, as shown. In this case, the Title 42B box of the Title item has a predetermined length which therefore defines the relative separation of the 100 and 300 tab alignments. As a result, all subsequent items must be positioned to match the length of the Title box 42B. If the Title box did not have a defined length, then the length would initially be set to a default value, although this may be subject to extension to ensure the 100 and 300 tab positions are acceptable.

The Type item 43 and the Default Days item 44 are then added on the next horizontal line, as shown in FIG. 6C. In this case, the start of the box 43B of the Type item 43 is aligned with the tab line 100 and hence with the boxes of the Title and Product Code items 42,40, whilst the Default Days item 44 is added to a new tab line 200. Once the distance between the tab lines is minimised, this will result in the Default Days item being positioned as close to the Type item as possible. In this case, the Default Days item 44 is positioned to the left of the end of the Title box 42B as it has a lower relative tab value.

The remainder of the items are positioned in a similar manner before the distance between tab lines is minimized so as to result in the arrangement shown in FIG. 5.

In the case of groups of items, it is possible for the system to define a group of items as being interconnected. Once this is completed, the group of items can be aligned with other items or other groups of items, as required. This is achieved in a similar manner to the aligning of individual items and will not therefore be described in any detail.

Thus, the relative tab stops are numeric values that enable the user to position and align items groups relative to each other (i.e. next to each other or below each other). Using relative tab stops also enables you to explicitly specify that a particular item or item group is to appear on a new line.

The user sets relative tab stops for both items and item groups using either or both of the following relative tab stop properties:

Start Tab Stop property
End Tab Stop property

The Start Tab Stop property and the End Tab Stop property determine whether it is the left hand edge, the right hand edge, or both edges of the item/item group that are aligned. The prompts can also be aligned using the item's Align Prompt property.

When using relative tab stops, the user can set the Tab Stop Scope property of a container object (i.e. an item group or module component) to align:

items within an item group with items outside the item group items within one module component with items in another module component The general procedures the user should follow when defining the items to be arranged are shown in Appendix A, with detailed examples of the use of relative tabs shown in FIGS. 7 to 15, and described in Appendix B.

APPENDIX A

How to position item groups using relative tab stops:

1. Create the first item group.
    a. Set the item group's Start Tab Stop property to a numeric value if you want the left hand edge of the item group aligned with any items or groups outside the item group for which the same relative tab stop value has been defined.
    b. Set the item group's End Tab Stop property to a numeric value if you want the right hand edge of the item group aligned with any items or item groups outside the item group for which the same relative tab stop value has been defined.
        Note that the value you enter for the End Tab Stop property must be greater than the value of the Start Tab Stop property (if set).
    a. Use the item group's Tab Stop Scope property to determine whether items with the item group are aligned with items outside the item group:
        i. set the item group's Tab Stop Scope property to Parent if you want items within the item group to be aligned with items outside the item group
        ii. set the item group's Tab Stop Scope property to Self if you do not want items within the item group aligned with items outside the item group
2. Create a second item group.
    a. Set the second item group's relative tab stop properties depending on where you want the second item group positioned relative to the item groups and item preceding it:
        i. if you want the second item group placed on the next line and vertically aligned with the first item group, set the Start Tab Stop property and/or End Tab Stop property to the same value as the first item group;
        ii. if you simply want the second item group to appear on the same line as the first item group, do not set the second item group's Start Tab Stop property or End Tab Stop property;
        iii. if you want the second item group to appear on the same line as the first item group, and you also want to align subsequent item groups below it, set the item group's Start Tab Stop property and/or End Tab Stop property to values greater than those defined for the first item group;
    b. Use the item group's Tab Stop Scope property to determine whether items within the item group are aligned with items outside the item group.
        Note that to align items in two different item groups using the same relative tab stop, you must set the Tab Stop Scope property of both item groups to Parent.
    a. Use the Tab Stop Scope property of the module component containing the item group to determine whether the item group (and the items/item groups within it) is aligned with item/item groups with the same relative tab stop value in other module component:
        i. set the module component's Tab Stop Scope property to Parent if you want items/item groups within the module component to be aligned with items/item groups in other module components
        ii. set the module component's Tab Stop Scope property to Self if you do not want items/item groups within the module component to be aligned with items/item groups in other module components How to position items using relative tab stops:

1. Create the first bound or unbound item.
    a. Set the item's Start Tab Stop property to a numeric value if you want the start of the item aligned with other items or item groups for which the same relative tab stop value has been defined.
    b. Set the item's End Tab Stop property to a numeric value if you want the end of the item aligned with other items or item groups for which the same relative tab stop value has been defined.
        Note that the value you enter for the End Tab Stop property must be greater than the value of the Start Tab Stop property (if set).
    a. Set the item's Align prompt property to determine whether the item's prompt is aligned with the prompts of other items for which the same relative tab stop has been defined.
2. Create the second bound or unbound item.
    a. Set the second item's relative tab stop properties depending on where you want the second item positioned relative to the first:
        i. if you want the second item placed on the next line and vertically aligned with the first item, set the Start Tab Stop property and/or End Tab Stop property to the same value as the first item
        ii. if you want the second item to appear on the same line as the first item, do not set the second item's Start Tab Stop property or End Tab Stop property
        iii. if you want the second item to appear on the same line as the first item, and you also want to align subsequent items below it, set the item's Start Tab Stop property and/or End Tab Stop property to values greater than those defined for the first item
    b. Set the second item's Align prompt property to determine whether the item's prompt is aligned with the prompt of other items for which the same relative tab stop has been defined.
3. Create subsequent bound and unbound items following the steps described above.

4. If one or more of the items is in an item group, use the item group's Tab Stop Scope property to determine whether the items within the group are aligned with items outside the item group, or with items in other item groups.

Note that to align items in two different item groups using the same relative tab stop, you must set the Tab Stop Scope property of both item groups to Parent.

5. Use the Tab Stop Scope property of the module component containing the items to determine whether they are aligned with items/item groups with the same relative tab stop value in other module components.

Note that to align items in two different module components using the same relative tab stop, you must set the Tab Stop Scope property of both module components to Parent.

APPENDIX B

Examples

Figure 7:
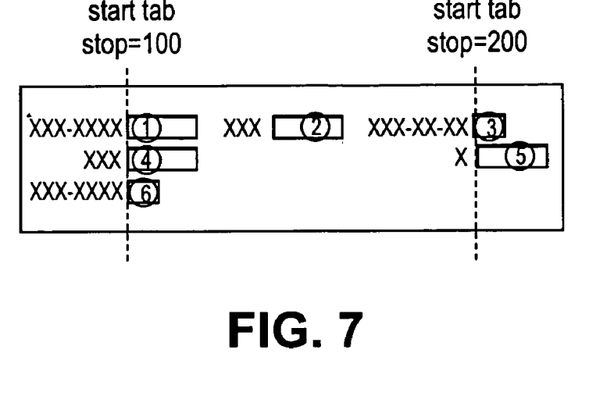

Example 1—FIG. 7

In this example, the start of each item with the same start tab stop number is vertically aligned.

| Item | Start tab | End tab | Align |
|------|-----------|---------|-------|
| 1 | 100 | — | No |
| 2 | — | — | — |
| 3 | 200 | — | No |
| 4 | 100 | — | No |
| 5 | 200 | — | No |
| 6 | 100 | — | No |

Figure 8:
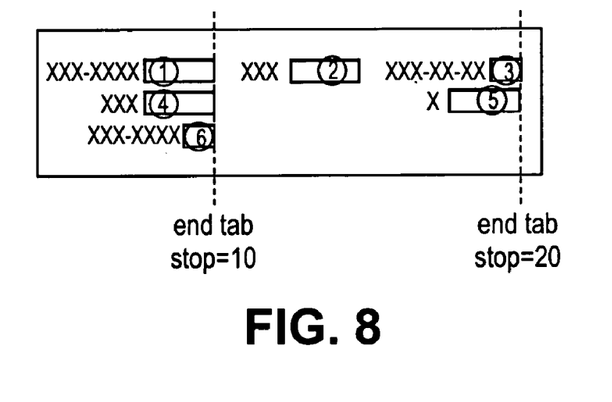

Example 2—FIG. 8

In this example, the end of each item with the same end tab stop number is vertically aligned.

| Item | Start tab | End tab | Align |
|------|-----------|---------|-------|
| 1 | — | 10 | No |
| 2 | — | — | — |
| 3 | — | 20 | No |
| 4 | — | 10 | No |
| 5 | — | 20 | No |
| 6 | — | 10 | No |

Figure 9:
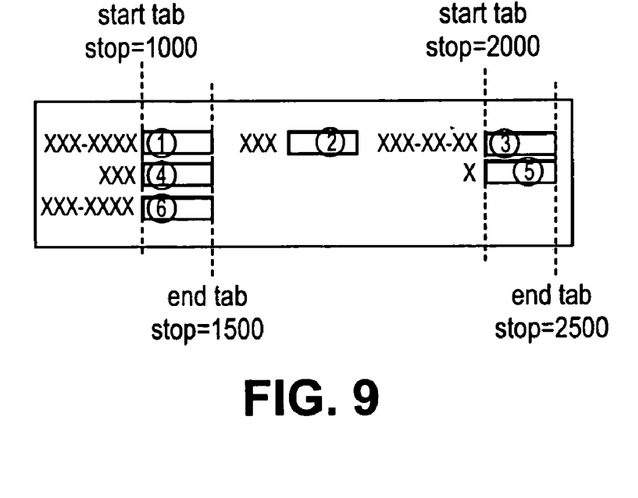

Example 3—FIG. 9

In this example, the start and ends of items with the same start and end tab stop numbers are vertically aligned.

| Item | Start tab | End tab | Align prompt |
|------|-----------|---------|--------------|
| 1 | 1000 | 1500 | No |
| 2 | — | — | — |
| 3 | 2000 | 2500 | No |
| 4 | 1000 | 1500 | No |
| 5 | 2000 | 2500 | No |
| 6 | 1000 | 1500 | No |

Items with the same Start Tab Stop and End Tab Stop properties are the width of the widest item with those properties. Thus, in this example, the system increases the widths of items 1 and 6 to be the same width as item 4, and increases the width of item 3 to be the same width as item 5.

Figure 10:
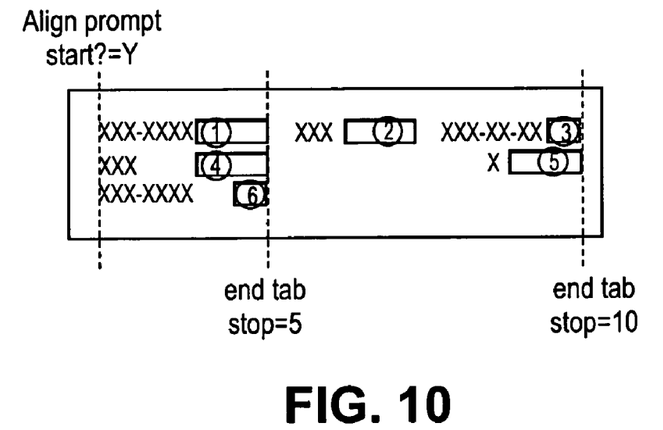

Example 4—FIG. 10

| Item | Start tab | End tab | Align |
|------|-----------|---------|-------|
| 1 | — | 5 | No |
| 2 | — | — | — |
| 3 | — | 10 | Yes |
| 4 | — | 5 | No |
| 5 | — | 10 | Yes |
| 6 | — | 5 | No |

Figure 11:
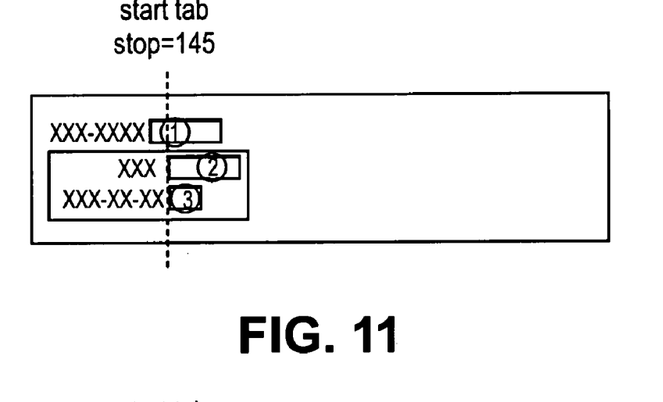

In this example:
the ends of items with the same end tab stop number are vertically aligned
the prompts of items are vertically aligned where items themselves are vertically aligned on the same tab stop number and those items' Align Prompt properties are set to Yes Example 5—FIG. 11

In this example:
the start of items in an item group with the same tab number are aligned
the item group's Tab Stop Scope property is set to Self

| Item | Start tab | End tab | Align |
|------|-----------|---------|-------|
| 1 | 145 | — | No |
| 2 | 145 | — | No |
| 3 | 145 | — | No |

Note that although item 1 has the same start tab stop as items 2 and 3, it is not aligned with those items because the item group's Tab Stop Scope property is set to Self.

Figure 12:
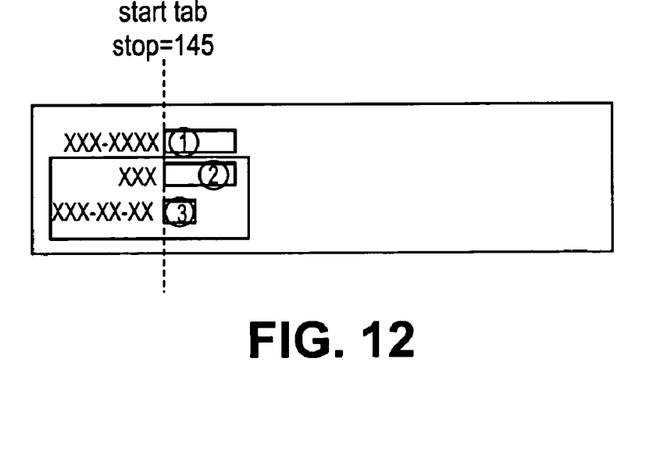

Example 6—FIG. 12

In this example:
the start of items both inside and outside an item group with the same tab number are vertically aligned
the item group's Tab Stop Scope property is set to Parent

| Item | Start tab | End tab | Align |
|------|-----------|---------|-------|
| 1 | 145 | — | No |
| 2 | 145 | — | No |
| 3 | 145 | — | No |

Figure 13:
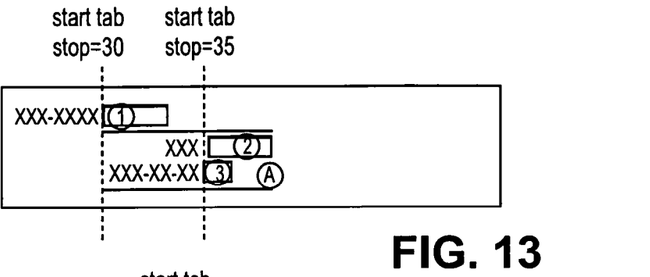

Example 7—FIG. 13

In this example:
an item and an item group with the same start tab stop number are vertically aligned
items within an item group with the same start tab stop number are vertically aligned

| Item or | Start tab | End tab | Align prompt |
|---------|-----------|---------|--------------|
| 1 | 30 | — | No |
| 2 | 35 | — | No |
| 3 | 35 | — | No |
| A | 30 | — | — |

Figure 14:
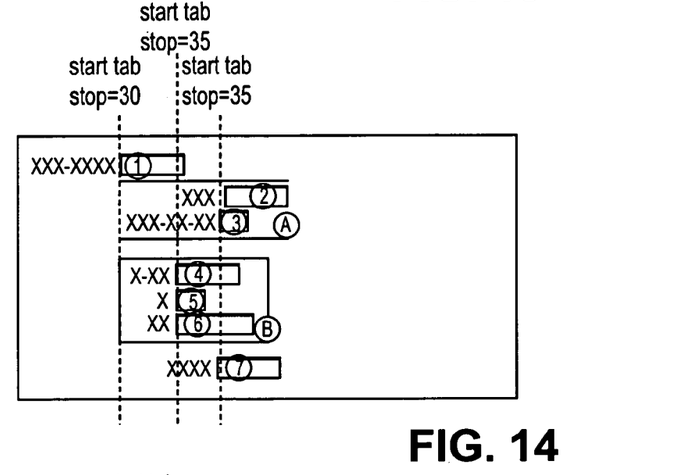

Example 8—FIG. 14

Item group's Start Tab Stop property is set to 30.

In this example:

items within an item group and items outside the item group with the same tab stop number are vertically aligned two item groups and an item with the same start tab stop number are vertically aligned the same value is specified for the Start Tab Stop property for items in two item groups, but the items are not aligned because the Tab Stop Scope property of one item group is set to Self

| Item or Item Group | Start tab stop | End tab Stop | Align Prompt |
|---|---|---|---|
| 1 | 30 | — | No |
| 2 | 35 | — | No |
| 3 | 35 | — | No |
| 4 | 35 | — | No |
| 5 | 35 | — | No |
| 6 | 35 | — | No |
| 7 | 35 | — | No |
| A | 30 | — | — |
| B | 30 | — | — |

Figure 15:
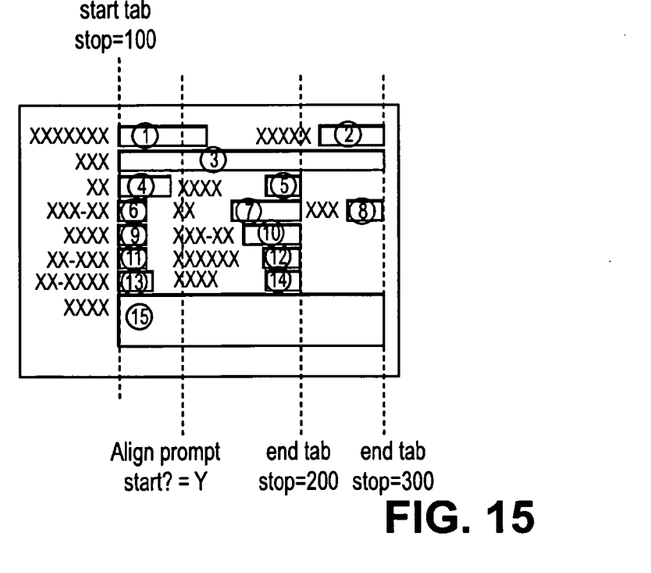

Example 9—FIG. 15

The Tab Stop Scope property of item group A is set to Parent. The Tab Stop Scope property of item group B is set to Self.

In this example:

multiple items and their prompts have been positioned using relative tab stops the Align prompt property of item 8 has been ignored to optimize the use of space

| Item | Start tab | End tab | Align |
|---|---|---|---|
| 1 | 100 | — | No |
| 2 | — | 300 | No |
| 3 | 100 | 300 | No |
| 4 | 100 | — | — |
| 5 | — | 200 | Yes |
| 6 | 100 | — | — |
| 7 | — | 200 | Yes |
| 8 | — | 300 | Yes |
| 9 | 100 | — | — |
| 10 | — | 200 | Yes |
| 11 | 100 | — | — |
| 12 | — | 200 | Yes |
| 13 | 100 | — | — |
| 14 | — | 200 | Yes |
| 15 | 100 | 300 | — |

System Architecture Overview

FIG. 16, in an embodiment, is an alternate computer/processing system 720 for implementing the invention, which includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722.

In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 722 can access two or more databases 732, stored in a variety of mediums, as previously discussed.

Referring to FIG. 17, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807.

A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A processing unit may be coupled via the bus 806 to a display device 811, such as, but not limited to, a cathode ray tube (CRT), for displaying information to a user. An input device 812, including alphanumeric and other keys, is coupled to the bus 806 for communicating information and command selections to the processor(s) 807. Another type of user input device may include a cursor control 813, such as, but not limited to, a mouse, a trackball, a fingerpad, or cursor direction keys, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information.

Various forms of computer-usable media may be involved in providing one or more sequences of one or more instructions to the processor(s) 807 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 806 may receive the infrared signals and place the instructions therein on the bus 806. The bus 806 may carry the instructions to the main memory 808, from which the processor(s) 807 thereafter retrieves and executes the instructions. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 724 and the host computer 722. The communication interface 814 of a respective processing unit transmits and receives electrical, electromagnetic or optical signals that include data streams representing various types of information, including instructions, messages and data.

A communication link 815 links a respective user station 724 and a host computer 722. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730.

A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method of aligning items within an electronic document using relative tab stops, each item being associated with one of the relative tab stops, the method comprising:
   a. determining the relative tab stop associated with the first item, the relative tab stop not representing an absolute location on a page;
   b. positioning the first item within the electronic document on the relative tab stop associated with the first item; and,
   c. for each further item:
      i. determining the relative tab stop associated with the further item;
      ii. positioning the item within the electronic document in accordance with the relative tab stop associated with the further item and the position of each previously positioned item associated with the same relative tab stop as the further item.

2. A method according to claim 1, wherein any items with a relative tab stop greater than the tab stop of a previously positioned item are displaced from the previous item in a first direction.

3. A method according to claim 2, wherein an item with no tab stop is displaced from the previous item in the first direction.

4. A method according to claim 2, wherein any items having a relative tab stop less than the relative tab stop of a previously positioned item are displaced from the previous item in a second direction opposite to the first direction.

5. A method according to claim 2, wherein any items having a relative tab stop less than the relative tab stop of the previously positioned item are displaced from the previously positioned item in a third direction perpendicular to the first direction.

6. A method according to claim 2, wherein any items having a relative tab stop equal to or greater than the relative tab stop of previously positioned items are aligned with the previously positioned items in the first direction.

7. A method according to claim 2, wherein each item has a predetermined size, and wherein the method comprises positioning each item so as to ensure that a predetermined distance exists between items in the first direction.

8. A method according to claim 1, wherein each relative tab stop includes at least one of first and second relative tab values, each relative tab value representing the relative tab position of a specific portion of the item.

9. A method according to claim 8, wherein the first and second relative tab values are start and stop tab values indicating the relative position of the start and end of the item within the document.

10. A method according to claim 1, wherein the items are positioned in the first direction in accordance with the relative tab stop, and wherein the method comprises adjusting the relative positioning of the tab stop values to maintain at least a minimum separation between the items.

11. Apparatus for aligning items within a document, the apparatus including a display for displaying the document; and, a processor, the processor being adapted to perform a method comprising:
   a. determine the relative tab stop of the first item, the relative tab stop not representing an absolute location on a page;
   b. position the first item within the document, on the determined relative tab stop; and,
   C. for each further item:
      i. determine the relative tab stop of the item;
      ii. position the item within the electronic document in accordance with the relative tab stop and the position of each previously positioned item having the same relative tab stop.

12. Apparatus according to claim 11, the apparatus further comprising a store for storing the relative tab stops of each of the items to be positioned, the processor being adapted to operate with the store to obtain the relative tab stops therefrom.

13. Apparatus according to claim 11, the apparatus further comprising an input device, the input device being adapted to cooperate with the processor to allow the user to enter tab stop values for each item to be defined.

14. A computer program product that includes a computer-usable medium having a sequence of instructions which, when executed by a processor, causes the processor to execute a process for aligning items within an electronic document, each item having a relative tab stop, the process comprising:
   a. determining the relative tab stop of the first item, the relative tab stop not representing an absolute location on a page;
   b. positioning the first item within the electronic document; and,
   c. for each further item:
      i. determining the relative tab stop of the item;
      ii. positioning the item within the electronic document in accordance with the relative tab stop and the position of each previously positioned item having the same relative tab stop.

15. A computer program product according to claim 14, wherein any items with a relative tab stop greater than the tab indication of a previously positioned item are displaced from the previous item in a first direction.

16. A computer program product according to claim 15, wherein an item with no tab stop is displaced from the previous item in the first direction.

17. A computer program product according to claim 15, wherein any items having a relative tab stop less than the relative tab stop of a previously positioned item are displaced from the previous item in a second direction opposite to the first direction.

18. A computer program product according to claim 15, wherein any items having a relative tab stop less than the relative tab stop of the previously positioned item are displaced from the previously positioned item in a third direction perpendicular to the first direction.

19. A computer program product according to claim 15, wherein any items having a relative tab stop equal to or greater than the relative tab stop of previously positioned items are aligned with the previously positioned items in the first direction.

20. A computer program product according to claim 15, wherein the items have a predetermined size, and wherein the process comprises positioning each of the items so as to ensure that a predetermined distance exists between the items in the first direction.

21. A computer program product according to claim 14, wherein the items are positioned in the first direction in accordance with the relative tab stop, and wherein the process comprises adjusting the relative positioning of the tab indication values to maintain at least a minimum separation between the items.

22. A computer program product according to claim 14, wherein each relative tab stop includes at least one of first and second relative tab values, each relative tab value representing the relative tab position of a specific portion of the item.

23. A computer program product according to claim 22, wherein the first and second relative tab values are start and stop tab values indicating the relative position of the start and end of the item within the document.

* * * * *